United States Patent [19]
Matsui et al.

[11] 3,848,694
[45] Nov. 19, 1974

[54] TORSIONAL DAMPER FOR MOTOR VEHICLE DRIVE TRAIN

[75] Inventors: Masashi Matsui; Teisuke Horio, both of Yokohama City, Japan

[73] Assignee: Nissan Motor Company, Limited, Yokohama, Japan

[22] Filed: Dec. 7, 1972

[21] Appl. No.: 311,713

[30] Foreign Application Priority Data
Jan. 10, 1972 Japan................................ 47-5445

[52] U.S. Cl................................. 180/70 P, 248/18
[51] Int. Cl.............................................. B60k 23/00
[58] Field of Search......... 180/70 P, 64, 71; 248/10, 248/18

[56] References Cited
UNITED STATES PATENTS
| | | | |
|---|---|---|---|
| 2,432,050 | 12/1947 | Thiry | 248/10 X |
| 2,450,279 | 9/1948 | Guy | 180/87 P X |
| 2,687,787 | 8/1954 | Gair | 248/18 X |
| 3,037,573 | 6/1962 | Larsen | 180/70 P |

FOREIGN PATENTS OR APPLICATIONS
786,789　11/1957　Great Britain..................... 180/70 P Primary Examiner—David Schonberg
Assistant Examiner—Terrance L. Siemens

[57] ABSTRACT

A torsional damper unit for use in a motor vehicle drive train is adapted to prevent resonant vibration in the drive train. This torsional damper unit is mounted on a companion flange of a drive pinion of a differential gear unit. Through this flange a propeller shaft is connected to a drive pinion.

4 Claims, 3 Drawing Figures

TORSIONAL DAMPER FOR MOTOR VEHICLE DRIVE TRAIN

This invention relates to torsional damper units and, more particularly, to a torsional damper unit for use in a drive train of a motor vehicle.

It is a primary object of the present invention to provide a drive train for a motor vehicle having a novel torsional damper unit to eliminate the noise produced by vibrational disturbances that originate in the drive train.

It is another object of the present invention to provide a torsional damper unit adapted to prevent resonant frequency vibration in a motor vehicle drive train.

It is still another object of the present invention to provide an improved and simplified form of torsional damper unit adapted for installation adjacent a differential gear unit of a motor vehicle drive train.

It is a still further object of the present invention to provide a damper unit which is adapted to be disposed between a universal joint of a propeller shaft and a differential gear unit of a motor vehicle drive train.

These and other objects and advantages of the present invention will become more apparent from the following description in conjunction with the accompanying drawings, in which.

Figure 1:
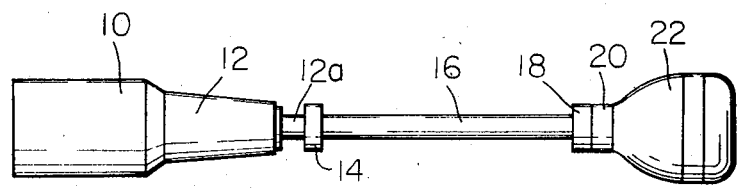
FIG. 1 is a schematic view of a motor vehicle drive train incorporating the torsional damper according to the present invention.

In the drawings FIG. 1 shows schematically a motor vehicle drive train. An internal combustion engine 10 is operatively connected to a power transmission 12. The power transmission 12 has, as customary, an output shaft 12a which is connected to a universal joint 14 in the usual manner. A propeller shaft 16 extends rearwardly from the universal joint 14 to a second universal joint 18, which in turn is connected through a torsional damper unit 20 to a standard differential gear unit 22 that transmits power through the axles (not shown) to the pair of driving wheels (not shown) of the motor vehicle.

Figure 2:
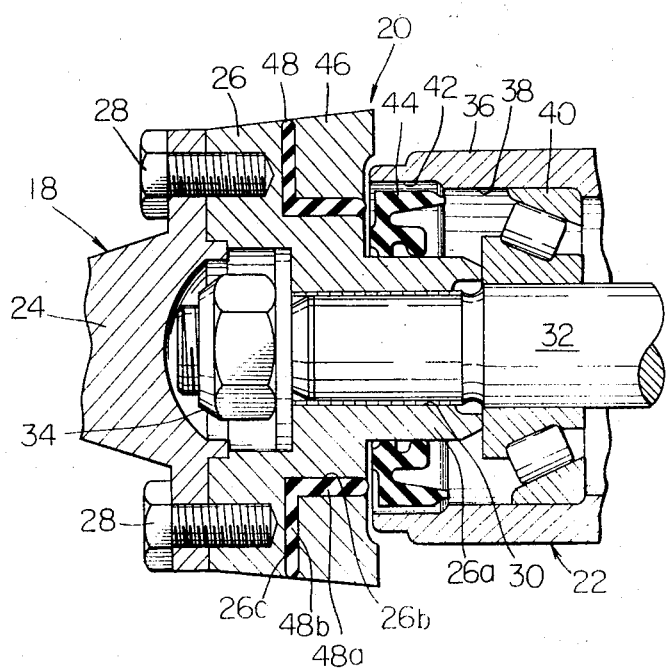
FIG. 2 is a fragmentary enlarged sectional view of the torsional damper unit shown in FIG. 1.

In FIG. 2, the second universal joint 18 is shown to have a flange 24, which is fixedly connected to a differential gear pinion drive flange or companion flange 26 by a plurality of suitable fastening means, such as bolts 28. This companion flange 26 forms a part of the differential gear unit 22, and has a plurality of splines 30, in to which a meshing splined portion of a differential gear drive pinion 32 forming a part of the differential gear unit 22 is fitted. The drive pinion 32 is fixedly connected to the companion flange 26 by a drive pinion nut 34 for rotation therewith. Designated by reference numeral 36 is a differential gear carrier forming a part of the differential gear unit 22 shown in FIG. 1. The differential gear carrier 36 has formed therein a bore 38, in which a thrust bearing assembly 40 is mounted through which the differential gear drive pinion 32 axially extends. The differential gear carrier 36 also has formed therein a bore 42 into which an oil seal ring 44 is disposed for preventing leakage of lubricating oil from the bore 38 of the differential gear carrier 36. The oil seal ring 44 is U or cup-shaped in cross section as viewed in FIG. 2 and has an inner circumferential well (not identified) sealingly engaging the outer circumferential wall of a cylindrical portion 26a of the companion flange 26. The details of other component parts of the differential gear unit are not important nor are they required for a full understanding of this invention and therefore no further description of the differential gear unit will be given.

An essential feature of the present invention is that the companion flange 26 is formed with an axially extending annular shoulder 26b and a radially extending annular shoulder 26c, on which an inertia ring 46 is mounted through a resilient member 48 of rubber or rubber-like resilient material which is surrounded by and connected to the inertia ring member 46 on its inner surfaces and the soulders 26b and 26c on its outer surfaces. The inertia ring 46 and resilient member 48 constitute the torsional damper unit 20 shown in FIG. 1. The resilient member 48 is L-shaped in cross-section and is composed of an axially extending annular portion 48a fitted or inserted between the axially extending annular shoulder 26b of the compansion flange 26 and the inner circumferential wall of the inertia ring member 46 and a radially extending flange portion 48b fitted or inserted between the radially extending annular shoulder 26c of the companion flange 26 and the adjacent end wall of the inertia ring member 46. The resilient member 48 is preferably retained between the axially extending annular shoulder 26 b of the companion flange 26 and the inertia ring member 46 by the forces resulting from the compression of the resilient member 48. Obviously the resilient member 48 could be bonded to either one of or to both the companion flange 26 and the inertia ring member 46 if it should be desired or otherwise some other retaining means could be used.

Figure 3:
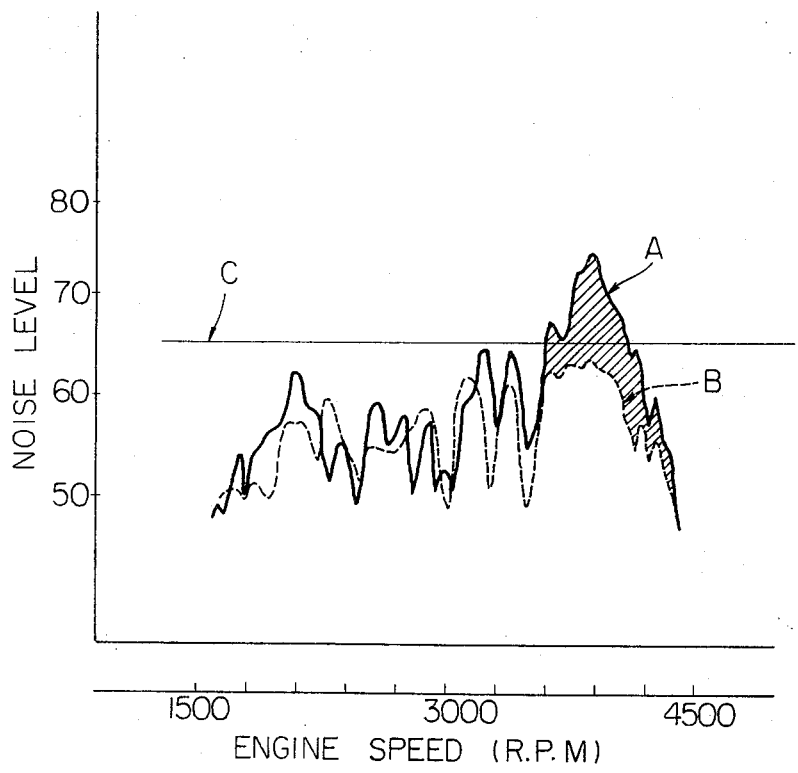
FIG. 3 is a graph illustrating the interior noise level of a motor vehicle during acceleration of the motor vehicle.

From various installation tests it has been found that in a drive train of the type disclosed, the critical position for damping the vibrations in the drive train is closely adjacent to the connection between the propeller shaft and the differential gear unit. According to the present invention, resonant frequency of vibration in the drive train can be effectively reduced with the use of the torsional damper unit provided between the universal joint flange of the propeller shaft and the differential gear unit thereby satisfactorily eliminating torsional vibrations or bivration noises transmitted to the interior of the motor vehicle. This is clearly seen from the graph of FIG. 3, which illustrates the interior noise level of the motor vehicle. The above results were obtained by using a motor vehicle equipped with a watercooled 1,200cc OHV engine operating at a compression ratio of 9.0 and developing 68 HP at 6,000 rpm output and a maximum torque of 9.7 kg.m at a speed of 3,600 rpm and equipped with the torsional damper unit according to the present invention having a weight of 450 gr, a moment of inertia of 0.004 kg.cm.sec$^2$ and a tuned frequency of 590 Hz. In FIG. 3, curve A represents the axle gear noise measured in side the motor vehicle where the torsional damper unit of the present invention is not employed, while a curve B indicates the axle gear noise measured inside the motor vehicle where the torsional damper of the present invention is used. As seen from the curve A, if the motor vehicle drive train is not equipped with the torsional damper unit of the present invention, the axle gear noise increases beyond permissible level represented by line C especially when the engine is running at speeds ranging from 3,600 rpm to about 4,000 rpm. If, on the contrary, the motor vehicle drive train is equipped with the torsional damper unit of the present invention, the level of the axle gear noise is decreased below the permissible value as indicated by the curve B in FIG. 3.

It will now be appreciated from the above description that the torsional damper unit according to the present invention is capable of significantly reducing the torsional vibration or vibration noise transmitted to the interior of the motor vehicle by a simple construction.

What is claimed is:

1. A motor vehicle drive line comprising, a differential gear unit having a differential pinion drive shaft, a companion flange surrounding the forward end of said pinion shaft, and a torsional vibration damper having an annular resilient member mounted on an axial end surface of said companion flange and an annular inertia member secured about said resilient member, said resilient member and said inertia member coaxially surrounding said companion flange.

2. A motor vehicle drive line comprising, a differential gear unit having a differential pinion drive shaft, a companion flange surrounding the forward end of said drive shaft and having an annular shoulder formed by a radially extending portion and an axially extending portion, a resilient member having a radially extending flange portion and an axially extending sleeve portion, said flange portion and said sleeve portion respectively mounted on said radially extending portion and said axially extending portion of said annular shoulder, and an annular inertial member coaxially attached about said resilient member, the outer diameter of said annular inertia member being substantially equal to the outer diameter of said radially extending portion of the companion flange.

3. A motor vehicle drive line comprising, a differential gear unit having a differential pinion drive shaft, a companion flange surrounding the forward end of said drive shaft and having an annular shoulder, a resilient member of L-shaped cross-section co-axially attached to said annular shoulder of said companion flange, and an inertial ring member coaxially mounted about said resilient member, said inertia ring member compressing said resilient member against said annular shoulder of said companion flange.

4. A motor vehicle drive line comprising, a differential gear unit having a differential pinion drive shaft, a companion flange surrounding the forward end of said pinion shaft and having an annular shoulder formed by a radially extending portion and an axially extending portion, a resilient member configured to extend along said radially extending portion and axially extending portion of the annular shoulder and attached thereto, and an inertia ring member coaxially mounted about said resilient member, the outer diameter of said annular inertia member being substantially equal to the outer diameter of said radially extending portion of the companion flange.

* * * * *